(12) United States Patent
Campa Coloma et al.

(10) Patent No.: US 11,305,535 B2
(45) Date of Patent: Apr. 19, 2022

(54) PRINT MASKS WITH DISABLED SECTIONS

(71) Applicants: Hewlett-Packard Development Company, L.P., Spring, TX (US); Alex Campa Coloma, Sant Cugat del Valles (ES); Jordi Bas Ferrer, Sant Cugat del Valles (ES); Adria Gallart del Burgo, Sant Cugat del Valles (ES); Maria Isabel Borrell Bayona, Sant Cugat del Valles (ES)

(72) Inventors: Alex Campa Coloma, Sant Cugat del Valles (ES); Jordi Bas Ferrer, Sant Cugat del Valles (ES); Adria Gallart del Burgo, Sant Cugat del Valles (ES); Maria Isabel Borrell Bayona, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/977,234

(22) PCT Filed: Mar. 21, 2018

(86) PCT No.: PCT/US2018/023486
§ 371 (c)(1),
(2) Date: Sep. 1, 2020

(87) PCT Pub. No.: WO2019/182578
PCT Pub. Date: Sep. 26, 2019

(65) Prior Publication Data
US 2021/0039386 A1 Feb. 11, 2021

(51) Int. Cl.
*B41J 2/14* (2006.01)

(52) U.S. Cl.
CPC .................. *B41J 2/1433* (2013.01)

(58) Field of Classification Search
CPC ................. B41J 2/1433; B41J 2/465
See application file for complete search history.

(56) References Cited

U.S. PATENT DOCUMENTS

| | | |
|---|---|---|
| 7,417,768 B1 | 8/2008 | Donovan et al. |
| 7,472,983 B2 | 1/2009 | Fellingham et al. |
| 7,715,043 B2 | 5/2010 | Billow et al. |
| 7,988,251 B2 | 8/2011 | Dimitrijevic et al. |
| 8,905,521 B2 | 12/2014 | Mueller et al. |
| 8,991,963 B2 | 3/2015 | Tanase et al. |

(Continued)

OTHER PUBLICATIONS

Ortiz, Maria V. et al., Inkjet Forensics, Sep. 27, 2006, Purdue University, <http://shay.ecn.purdue.edu/~prints.

*Primary Examiner* — Bradley W Thies
(74) *Attorney, Agent, or Firm* — HP Inc. Patent Department (57) ABSTRACT

In an example print system including a mask engine and print engine, the mask engine is able to cause generation of print masks with disabled sections that are non-overlapping. In an example method of printing, a number of passes over a zone of media is identified, a plurality of print masks corresponding to the zone are generated with a disabled section of pixels that are non-overlapping, and the number of passes are printed based on the plurality of masks such that the disable pixels in each print mask are in a different relative position with respect to a location of the media.

15 Claims, 6 Drawing Sheets

(56) References Cited

U.S. PATENT DOCUMENTS

| | | |
|---|---|---|
| 9,327,535 B2 | 5/2016 | Fernandez |
| 2002/0027575 A1 | 3/2002 | Bruch et al. |
| 2006/0120787 A1* | 6/2006 | Abello ............... G06K 15/1857 400/76 |
| 2009/0033694 A1 | 2/2009 | Shi et al. |
| 2017/0157949 A1* | 6/2017 | Madigan ............ H01L 51/0005 |

* cited by examiner

PRINT MASKS WITH DISABLED SECTIONS

BACKGROUND

Images are processed for use with computing machines, such as a print apparatus. A print apparatus, for example, may use control data based on processed image data to reproduce a physical representation of an image by operating a print fluid ejection system according to the control data. An image may be processed in a print apparatus pipeline or processed offline on a separate compute device, such as a print server, to generate instructions usable by the print apparatus to operate the components of the print apparatus to produce the image.

DETAILED DESCRIPTION

In the following description and figures, some example implementations of print apparatus, print systems, and/or methods of printing are described. In examples described herein, a "print apparatus" may be a device to print content on a physical medium (e.g., paper, textiles, a layer of powder-based build material, etc.) with a print material (e.g., ink or toner). For example, the print apparatus may be a wide-format print apparatus that prints latex-based print fluid on a print medium, such as a print medium that is size A2 or larger. In some examples, the physical medium printed on may be a web roll or a pre-cut sheet. In the case of printing on a layer of powder-based build material, the print apparatus may utilize the deposition of print materials in a layer-wise additive manufacturing process. A print apparatus may utilize suitable print consumables, such as ink, toner, fluids or powders, or other raw materials for printing. In some examples, a print apparatus may be a three-dimensional (3D) print apparatus. An example of fluid print material is a water-based latex ink ejectable from a print head, such as a piezoelectric print head or a thermal inkjet print head. Other examples of print fluid may include dye-based color inks, pigment-based inks, solvents, gloss enhancers, fixer agents, and the like.

A print head of the print apparatus may include a plurality of nozzles. The velocity and number of drops ejected by the print head may generate an effect in a print zone (i.e., a location of placing print material on a print medium from a print head). For example, pressure in the localized area of the print zone may increase sufficiently to generate an air current when the number of drops being ejected achieves a threshold based on the characteristics of the drops, such as speed of the drops and density of the print material. Such airflows may diverge print material from the intended destination or affect trajectories of satellite drops (i.e., portions of print material of the drop smaller than the overall drop ejected from the print head that separates from the main volume of the drop). In this manner, satellite drops may be caught in airflows in the print zone and may generate a worm-like effect on the image, discussed herein as an aeroworm effect, for example.

Various examples described below relate to using a print mask to generate an image where the print mask reduces aeroworm effects within the print zone. The image processing may involve generating a mask with a number of pixels disabled such that an area of the print head stops nozzle actuation for a given time period. By pausing actuation of the print head, some airflow currents may be reduced below a strength that would affect trajectories of satellite drops and, in turn, reduce an aeroworm effect on the output image, for example.

Figure 1:
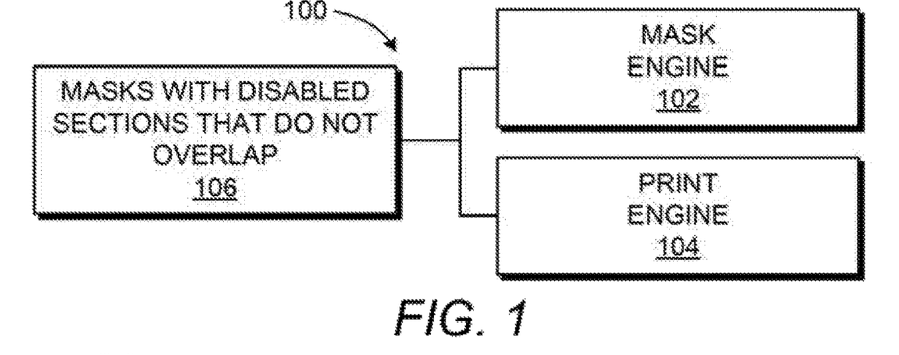
FIGS. 1 and 2 are block diagrams depicting example print systems.
Figure 2:
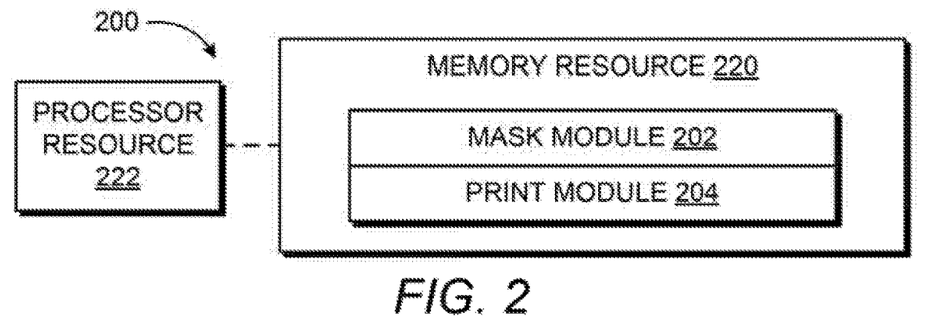

FIGS. 1 and 2 are block diagrams depicting example print systems 100 and 200. Referring to FIG. 1, the example print system 100 of FIG. 1 generally includes a mask engine 102 and a print engine 104. In general, the print engine 104 causes printing (e.g., generates instructions to operate a print apparatus) to produce an image on a print medium using a plurality of masks 106 generated by the mask engine 102 which produces the plurality of masks 106 with disabled sections of pixels that do not overlap with respect to the other masks. As used herein, "non-overlapping" means to not overlap (i.e., does not partially cover) and "non-repeating" means to not repeat.

The mask engine 102 represents any circuitry or combination of circuitry and executable instructions to cause an imaging pipeline to generate a plurality of masks with non-overlapping disabled sections for printing image data in a media width zone. The media width zone is an area of print media that extends across the width of the media (e.g., perpendicular to the media advance direction) and the disabled sections are non-overlapping relative to a media advance direction. For example, the mask engine 102 may be a combination of circuitry and executable instructions that cause generation of a first mask corresponding to a first set of nozzle actuations of a print head during a first pass along the media width zone including a first section of disabled nozzles unactuated (e.g., a section of pixels corresponding to nozzles that are not activated to eject print fluid), a second mask corresponding to a second set of nozzle actuations of the print head along the media width zone including a second section of disabled nozzles unactuated during a second pass over the media width zone (wherein the second section does not overlap the first section with respect to the media width zone), and a third mask corresponding to a third set of nozzle actuations of the print head along the media width zone including a third section of disabled nozzles unactuated during a third pass over the media width zone (wherein the third section does not overlap the first section and the second section with respect to the media width zone).

Each mask may include a number of pixels that represent whether a print head is to eject print material at a location or not. In this manner, the plurality of print masks 106 generated by the mask engine 102 are to include an enabled section of pixels and/or a disabled section of pixels. A pixel represents an element of image data, such as colorant information, and a print mask pixel represents whether an actuation instruction corresponding to the associated color is to be placed at a location, such as a particular locational element on a print medium. In this manner, a print mask represents locations of a print medium and whether or not to actuate a nozzle of the print head corresponding to that location on the print medium during a pass. The disabled section of pixels may be a continuous section of disabled pixels (e.g., a number of nozzle positions are not actuated and do not place print fluid on the print medium). The sections of disabled pixels may repeat along the media width at intervals based on a size of the print mask. For example, a print mask of 256 pixels used in a four-pass print mode may include a 64-pixel wide disabled section that occurs every 256 pixels. In this manner, every pixel in a horizontal line may be printed by the same nozzle, therefore that nozzle stops for X number of nozzles every Y nozzles, and repeats the pattern N times until the first pass is complete, in some examples, such as with respect to FIG. 7, the mask engine 102 may generate a print mask with a ramp section may exist between the enabled and disabled section. Ramps are discussed further herein with respect to FIG. 7, for example.

The plurality of masks 106 generated by the mask engine 102 of FIG. 1 are printed across a number of passes of a print head over a print medium to generate appropriate colors based on image data. A "color" may be said to be a category that is used to denote similar visual perceptions where two colors are said to be similar if they produce a similar effect on a group of one or more people. These categories can then be modelled using a lower number of variables. A color model may define a color space, i.e., a multi-dimensional space with dimensions of the space representing variables within the color model and a point in the multi-dimensional space representing a color value. Examples include an additive color model using a in a red, green, blue (RGB) color space, a subtractive color model using a cyan, magenta, yellow and black (CMYK) color space, the International Commission on illumination (CIE) 1931 XYZ colorspace, the CIE 1976 (L*, a*, b*-CIELAB or 'LAB') color space, and Neugebauer Primary area coverage (NPac) space. A print apparatus capable of making multiple passes over locations of the media to be printed on may generate a color using a number of combinations of colors (where a color combination includes the use of a single colorant to produce the color or the use of multiple colorants to produce the color) and/or order of placing color on the media location. In such a print system, the combination of colorant print material may be modeled and divided among multiple passes using halftone and/or masking techniques. For example, a print system may generate masked halftone data for printing using any suitable halftoning methods, such as matrix-selector-based Parallel Random Area Weighted Area Coverage Selection (PARAWACS) techniques and techniques based on error diffusion. An example of a print system that uses area coverage representations for halftone generation is a Halftone Area Neugebauer Separation (HANS) pipeline.

The mask engine 102 may include circuitry or a combination of circuitry and executable instructions to determine that a print job may generate an aeroworm effect when printed based on actuation frequency threshold and image data of the print job. For example, the mask engine 102 may execute instructions to cause circuitry to analyze the print job for any continuous actuations above a threshold corresponding to an aeroworm tolerance and determine to use a particular type of mask to reduce the aeroworm effect. The mask engine 102 may, for example, identify a sensitivity level based on a characteristic of print material to be ejected by the print head. Example characteristics that may affect potentiality of excessive airflows that produce aeroworm effects may include drop size, drop speed, print material density, carriage speed, and the like.

The mask engine 102 may identify a particular mask for each pass across the print zone, where each mask of passes over the same zone may correspond and complement each other with offset disabled sections, such that they do not overlap. The number of passes over a particular zone may be based on the print mode. For example, the print mode may be a four-pass, six-pass, or eight-pass print mode and the mask engine 102 may generate four, six, or eight print masks, respectively. The width of the section of disabled pixels of each print mask generated by the mask engine 102 may be based on the number of passes of the print mode. For example, if the print mask is 480 pixels wide, the size of the disabled section may be the size of 120, 80, or 60 pixels depending on the four-pass, six-pass, or eight-pass modes, respectively. The plurality of print masks 106 may overlap with respect to a zone of media, such as a swath zone that is the length of the printable area of the print head and extends across a width of the media. In a multi-pass print mode, the carriage of the print apparatus may move the print head over each zone of the media the number of times of the passes of the print mode. For example, in a six-pass print mode, the print head may be guided over a media width zone (e.g., a zone that extends across the width of the media) six times. In some examples, the media may move in the media advance direction a portion of the zone in each pass. For example, in a six-pass print mode, the media may move one-sixth of the length of the printable area of the print head between each pass of the print head where the media width zone has a width in the media advance direction that is about the length of the printable area of the print head. In this manner, the plurality of masks 106 may be based on the media width zone that is determined based on an architecture of the print head (e.g., the length of the print head). The plurality of print masks 106 may repeat with every media width zone of the print job. Such examples are discussed further herein, in particular with respect to FIGS. 8-12.

The print engine 104 of FIG. 1 represents any circuitry or combination of circuitry and executable instructions to cause a print head to eject print material in accordance with the plurality of masks 106. For example, the print engine 104 may be a combination of circuitry and executable instructions that generate instructions that cause a print head to eject print material in accordance with the plurality of masks such that print material ejected using the first mask with a first disabled section, the second mask with a second disabled section, and the third mask with a third disabled section where the masks overlap with respect to a length of the media width zone and the disabled section correspond to instructions to not actuate nozzles. In that example, each of the disabled sections of the mask are large enough above a threshold and do not overlap with respect to each mask to, for example, ensure the print head does not actuate nozzles corresponding to the disabled sections and generally stops actuation a number of nozzles for a continuous period of time.

The plurality of print masks 106 are complimentary such that each mask includes a portion of disabled pixels in each mask that, when combined, place a number of layers of print material on the media width zone. For example, the number of layers may be less than the number of passes and without an aeroworm effect by not actuating at least a single pass-worth of nozzles across the passes where such a reduction would bring the amount of continuous nozzle actuation below the threshold that produces an aeroworm effect. In an example four-pass print mode, the mask engine 102 may generate four masks to be used over four passes with a disabled section divided among the four print masks. In that example, the number of disabled columns may be equal to or less than the number of columns of the print mask divided by the number of passes and the disabled section repeats along a media axis and is non-repeating within an area of a size of the print mask. In some examples, the above examples could be extended to an additional pass to retain image quality with the loss of actuations to compensate for areoworms in a multi-pass print mode and the print mask may be divided among all passes including the additional pass. For example, a selection of a print mode to use masks with disabled sections may generate five print masks over five passes with a disabled section divided among the five print masks that when printed correspond to the same image quality of four coats of print fluid over the section and with reduced aeroworm effect. In this manner, a user may select any number of print modes and/or image quality specifications and use the techniques described herein to reduce aeroworm effects during a print job.

In some examples, functionalities described herein in relation to any of FIGS. 1-4 may be provided in combination with functionalities described herein in relation to any of FIGS. 5-14.

FIG. 2 depicts an example system 200 that comprises a memory resource 220 operatively coupled to a processor resource 222. Referring to FIG. 2, the memory resource 220 may contain a set of instructions that are executable by the processor resource 222. The set of instructions are operable to cause the processor resource 222 to perform operations of the system 200 when the set of instructions are executed by the processor resource 222. The set of instructions stored on the memory resource 220 may be represented as a mask module 202 and a print module 204. The mask module 202 and the print module 204 represent program instructions that when executed cause function of the mask engine 102 and the print engine 104 of FIG. 1, respectively.

The processor resource 222 may carry out a set of instructions to execute the modules 202, 204, and/or any other appropriate operations among and/or associated with the modules of the system 200. For example, the processor resource 222 may carry out a set of instructions to generate a first print mask for a first pass with a first section of pixels with a number of pixels disabled across a number of columns that is equal to or greater than (e.g., not less than) a number of passes corresponding to a swath zone, generate a second print mask for a second pass with a second section of the pixels with the number of relatively different pixels disabled across the number of columns that is equal to or greater than the number of passes corresponding to the swath zone (where the first pass and second pass overlap, such as where the first section of pixels and the second section of pixels overlap relative to a length of the swath zone and do not overlap relative to a width of the swath zone), and generate printing instructions using the first print mask and the second print mask that cause a print apparatus to eject a plurality of layers of print fluid over the swath zone that is less than the number of passes. For another example, the processor resource 222 may carry out a set of instructions to determine whether to generate print masks with ramps that are between an area of disabled nozzles and an area of enabled nozzles based on a color combination, determine whether to generate print masks with an inter-swath ramp based on a media advance characteristic and the color combination, generate masks with ramps in the media advance direction and ramps perpendicular to the media advance direction. For yet another example, the processor resource 222 may carry out a set of instructions to identify a number of passes corresponding to a print mode, divide a number of nozzles into a number of sections based on the number of passes of the print mode, generate a plurality of print masks designating each of the number of sections to be disabled during a pass of the media width zone of the number of passes of the print mode, and generate instructions to cause the print apparatus to apply the plurality of print masks during corresponding passes of the print head carriage over the swath zone to generate a repeating pattern of offset, nonoverlapping sections of disabled nozzles. For yet another example, the processor resource 222 may carry out a set of instructions to generate the plurality of print masks using a blue noise distribution with the offset, non-overlapping sections of disabled nozzles repeating based on a number of nozzles corresponding to a width of each of the plurality of print masks and being non-repeating within the number of nozzles corresponding to the width of each of the plurality of print masks such that the disabled sections do not overlap based on shifts of the offset sections for each pass.

Although these particular modules and various other modules are illustrated and discussed in relation to FIG. 2 and other example implementations, other combinations or sub-combinations of modules may be included within other implementations. Said differently, although the modules illustrated in FIG. 2 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules.

A processor resource is any appropriate circuitry capable of processing (e.g., computing) instructions, such as one or multiple processing elements capable of retrieving instructions from a memory resource and executing those instructions. For example, the processor resource 222 may be a central processing unit (CPU) that enables printing using masks with disabled sections by fetching, decoding, and executing modules 202 and 204. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

A memory resource represents a medium to store data utilized and/or produced by the system 200. The medium is any non-transitory medium or combination of non-transitory media able to electronically store data, such as modules of the system 200 and/or data used by the system 200. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. A memory resource may be said to store program instructions that when executed by a processor resource cause the processor resource to implement functionality of the system 200 of FIG. 2. A memory resource may be integrated in the same device as a processor resource or it may be separate but accessible to that device and the processor resource. A memory resource may be distributed across devices.

In the discussion herein, the engines 102 and 104 of FIG. 1 and the modules 202 and 204 of FIG. 2 have been described as circuitry or a combination of circuitry and executable instructions. Such components may be implemented in a number of fashions. Looking at FIG. 2, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on a memory resource may comprise any set of instructions to be executed directly (such as machine code) or indirectly (such as a script) by a processor resource.

In some examples, the system 200 may include the executable instructions may be part of an installation package that when installed may be executed by a processor resource to perform operations of the system 200, such as methods described with regards to FIGS. 1-2. In that example, a memory resource may be a portable medium such as a compact disc, a digital video disc, a flash drive, or memory maintained by a computer device, such as a web server, from which the installation package may be downloaded and installed. In another example, the executable instructions may be part of an application or applications already installed. A memory resource may be a non-volatile memory resource such as read only memory (ROM), a volatile memory resource such as random-access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid-state drive (SSD), or an optical drive.

Figure 3:
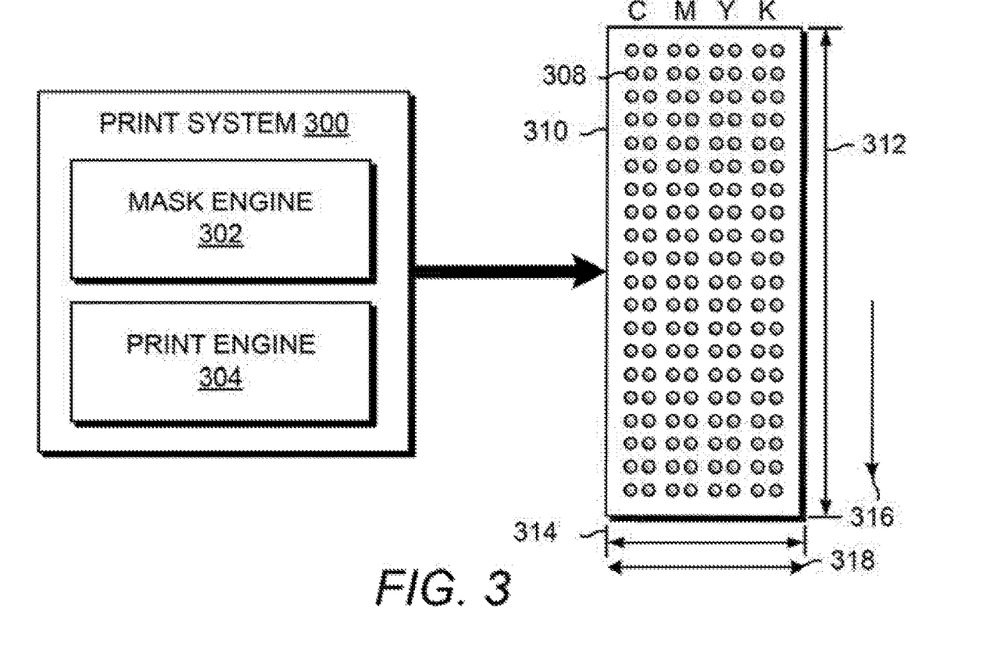
FIGS. 3 and 4 depict example environments in which various print systems may be implemented.
Figure 4:
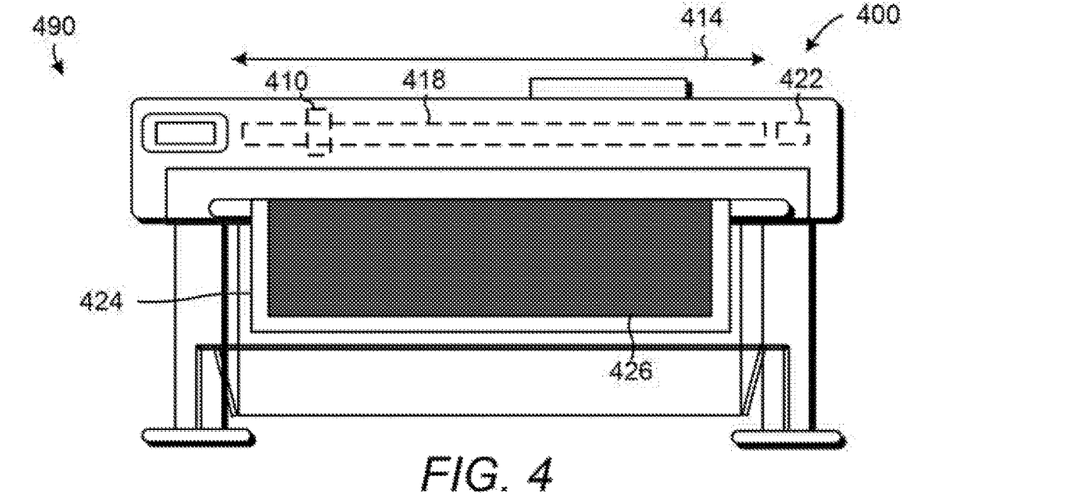

FIGS. 3 and 4 depict example environments in which various print systems may be implemented. Referring to FIG. 3, the print system 300 (described herein with respect to FIGS. 1 and 2) may represent generally any circuitry or combination of circuitry and executable instructions to print. The print system 300 may include a mask engine 302 and a print engine 304 that are the same as the mask engine 102 and the print engine 104 of FIG. 1, respectively, and the associated descriptions are not repeated for brevity.

The print system 300 provides instructions to operate the print head 310. The print head 310 includes a number of arrays of nozzles 308 that extend along the length 312 of the print head and the width 314 of the print head. A column of nozzles (i.e., a set of nozzles that extend along the length of the printhead) may correspond to a particular colorant, such as cyan (C), magenta (M), yellow (Y), or black (K). A print apparatus, such as the print apparatus 490 of FIG. 4, may move the print media in a media direction 316 and may move the print head 310 along a carriage direction 318 transversal to the media direction in a print apparatus with a reciprocating print head carriage. Other examples of print apparatus may include a fixed pint head that extends along the width of the media (i.e., the transversal direction 318).

The engines 302 and 304 may be integrated into a compute device, such as a print seer or a print apparatus 490 of FIG. 4. The engines 302 and 304 may be integrated via circuitry or as installed instructions into a memory resource of the compute device. Referring to FIGS. 1-3, the engines 102 and 104 of FIG. 1 and/or the modules 202 and 204 of FIG. 2 may be distributed across devices. The engine and/or modules may complete or assist completion of operations performed in describing another engine and/or module. Although the various engines and modules are shown as separate engines in FIGS. 1 and 2, in other implementations, the functionality of multiple engines and/or modules may be implemented as a single engine and/or module or divided in a variety of engines and/or modules. In some example, the engines of the system 300 may perform example methods described in connection with FIGS. 5-14.

FIG. 4 depicts an example print system 400 usable in a print apparatus 490. The example components of FIG. 4 include a means for transporting the media 424 in a media advance direction, a print head station 410 for receiving a print head (such as print 310 of FIG. 3) and a carriage track 418 to move the print head station 410 across a width of media 424 in a carriage direction 414 transversal to the media advance direction. A controller 422 controls position and movement of the print head station 410 and performs the functions discussed with respect to the mask engine 102 and the print engine 104 of FIG. 1. For example, the controller 422 includes a processor resource and a memory resource with a carriage control program stored thereon (e.g., to control movement of the carriage) as well as the mask module 202 and the print module 204 of FIG. 2 stored thereon that when executed perform the operations of the print system 200 of FIG. 2. The print apparatus 480 uses image data to produce an output image 426 via operation of the controller 422.

Figure 5:
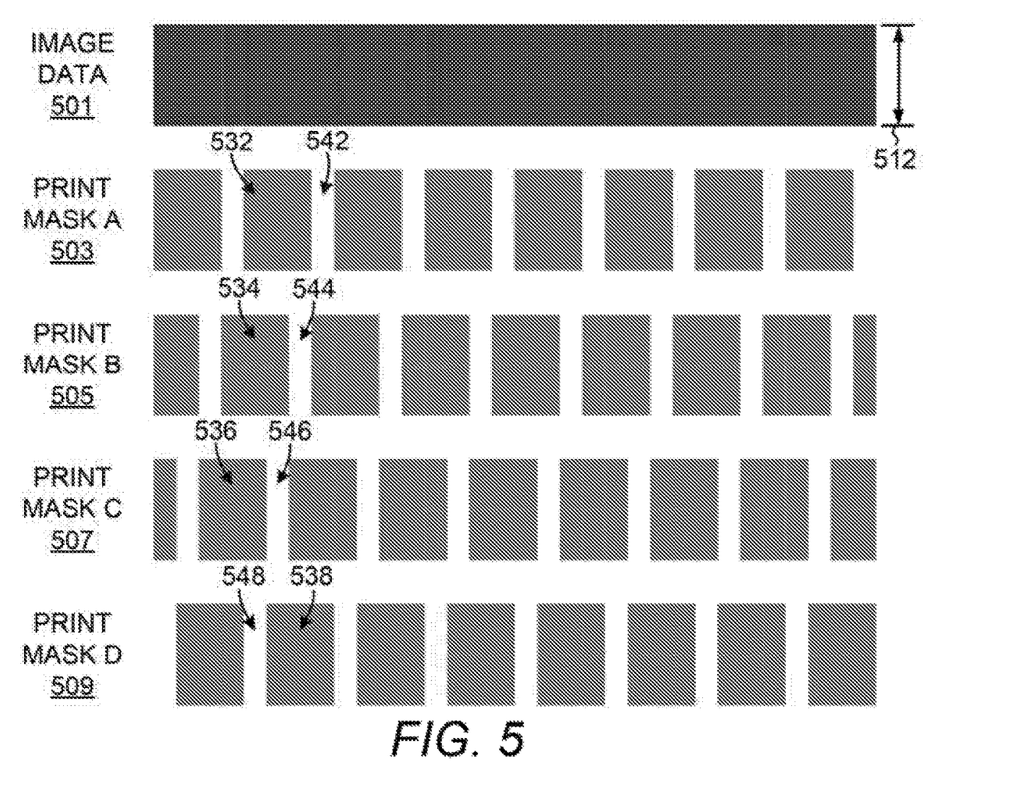
FIGS. 5-7 depict example print masks corresponding generated by an example print system according to an example.
Figure 6:
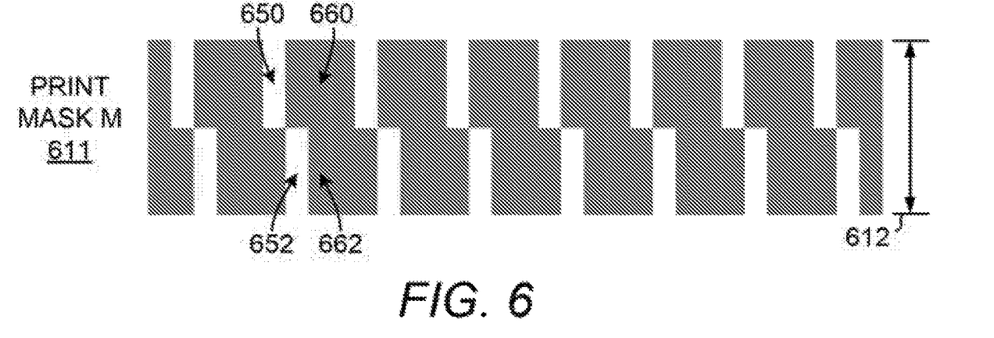
Figure 7:
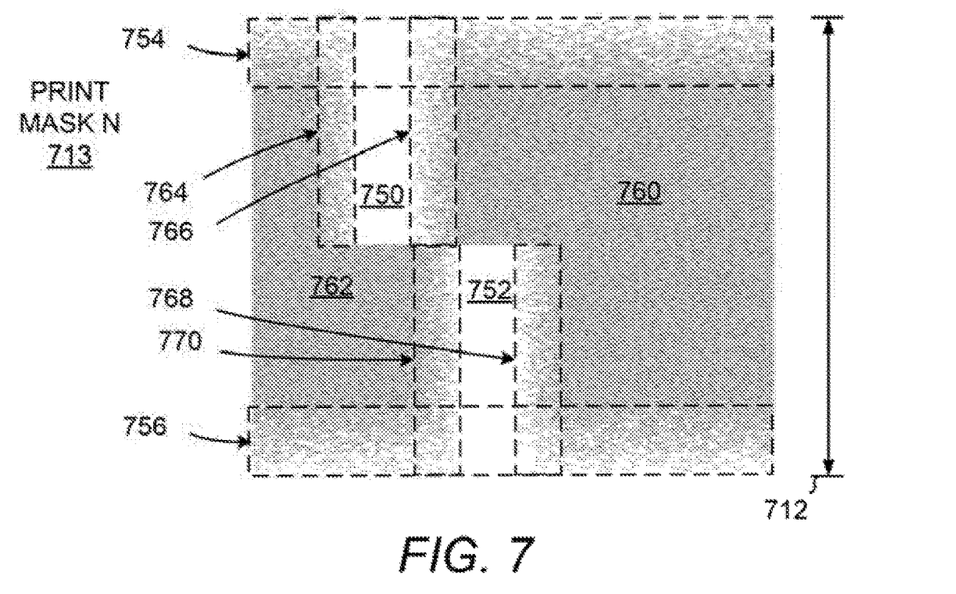
Figure 8:
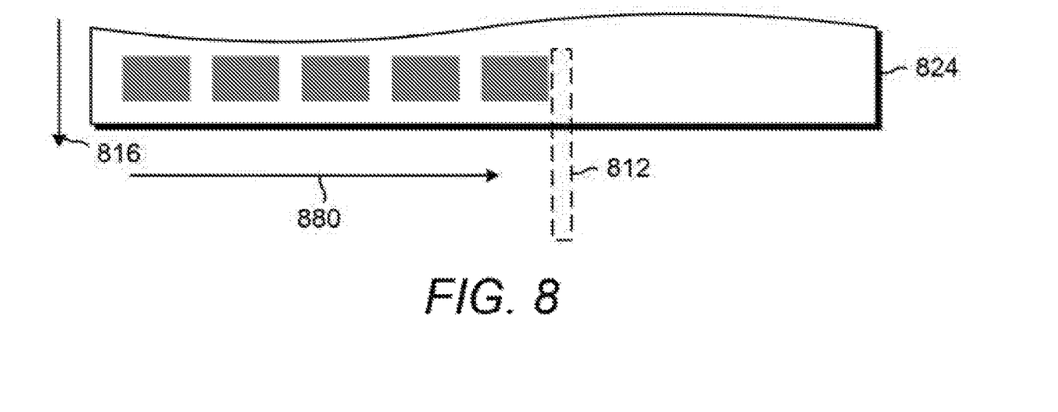
FIGS. 8-12 depict example output states of operation of an example print apparatus applying print material onto a print medium using example print masks according to an example.
Figure 9:
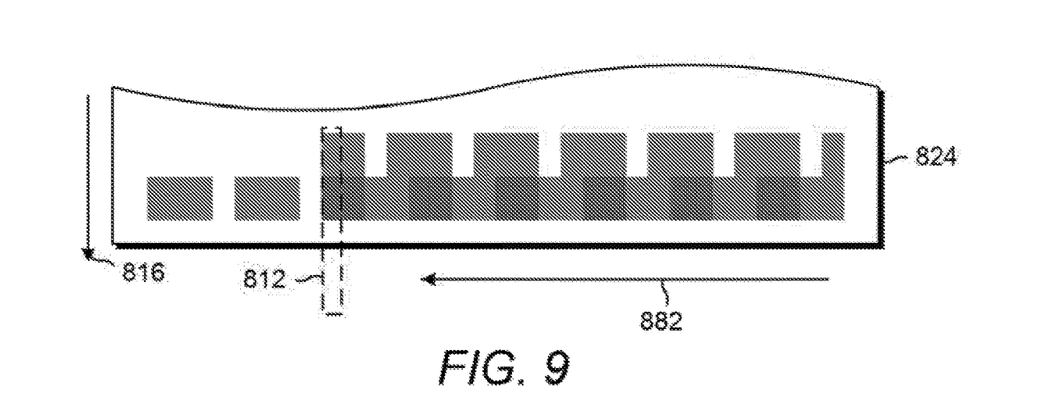
Figure 10:
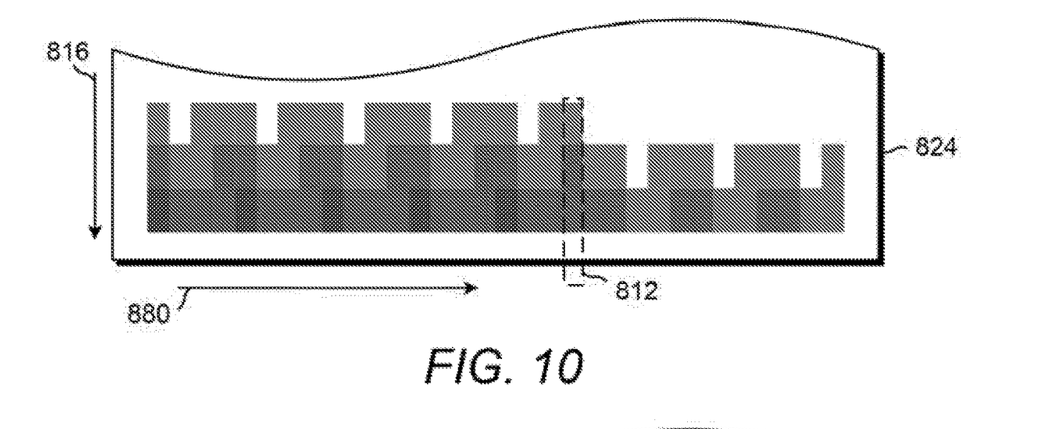
Figure 11:
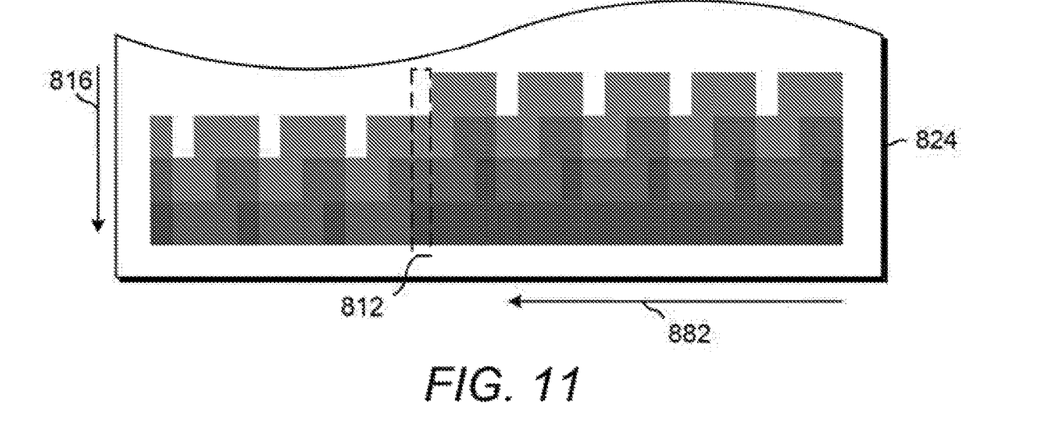
Figure 12:
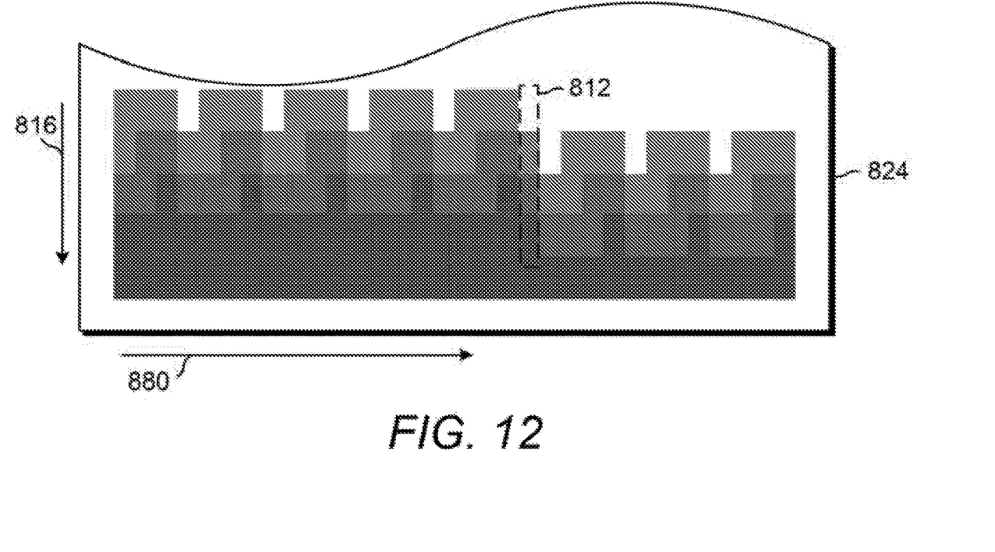

FIGS. 5-7 depict example print masks 503, 505, 507, and 509 generated by an example print system according to an example. Referring to FIG. 5, an example image data 501 is depicted for a swath zone. The size 512 of the swath zone is equivalent to the printable length of the print head, such as the length 2 of the print head 10 of FIG. 3. The example image data 501 may be reproducible on a print apparatus using a four-pass print mode. In the example of FIG. 5, the image data 501 is divided among four print masks including print mask A (503), print mask B (505), print mask C (507) and print mask D (509). In this manner, when all the masks 503, 505, 507, and 509 are used to print over the swath zone the output image is to reproduce the image data 501. The print systems discussed herein, such as print system 100, are usable to produce the example print masks 503, 507, and 508.

Print mask 503, 505, 507, and 509 include enabled sections 532, 534, 536, and 538 and disabled sections 542, 544, 546, and 548, respectively. A print system may use the print masks 503, 505, 507, and 509 to eject layers of print fluid on a print medium to generate output corresponding to the image data that as the layers corresponding to each mask overlay each other, the disabled sections are non-overlapping and thus each portion of the swath zone is disabled in at least e of the four passes across the swath zone. In this manner, the image data 501 is reproducible while reducing nozzle actuation below a threshold amount that might incur an aeroworm effect.

Referring to FIG. 6, the print masks may have disabled sections that re not full columns of disabled, pixels. For example, the the disabled sections may be different for each pass due to the shift of the passes when the media moves. In this manner, the position of the print head may be different in a h pass with the print head length being equal to the sin of the media width zone 612. The masks may correspond and compensate for the movement of the media between passes or may otherwise track the disabled sections in preceding passes such that the subsequent passes place a disabled section of the subsequent pass so that it is not overlapping a disabled section of a previous pass. In the example of FIG. 6, an example print mask M (611) includes enabled sections 660 and 562 and disabled sections 650 and 652 where the nozzles of the continuous disabled section are distributed among columns in the area of 650 and 652.

Referring to FIG. 7, an example print mask N (713) (of length 712, which may be the printable length of a print head) may include ramps. As used herein, a ramp represents an area of pixels that includes enabled pixels and disabled pixels. A ramp generally has a gradual effect where the ratio of enable pixels to disabled pixels changes across the ramp area. A ramp may assist improvement of image quality to allow passes of print material to overlap without visually abrupt edges (e.g., visually smooth transition between sections of pixels). A ramp may be used between swaths, such as ramp sections 754 and 756 which are media advance ramps. An example ramp may be between an enabled section (such as enabled sections 760 and 762) and a disabled section (such as disabled sections 750 and 752). Such example ramps may be sections 764, 766, 768, and 770 depicted in FIG. 7. By generating a plurality of masks that include a ramp of disabled and enabled nozzles along a carriage advance direction adjacent to each disabled section, the overlay of disabled sections and enabled sections of the print masks may be more smooth, continuous, or otherwise with softer, rather than abrupt changes of image in the final output image.

The ramp may have a size, a density, or severity of gradient that may be different based on the color combination of the image data filtered by the print masks. In this manner, a characteristic of the ramp of each of the plurality of masks may be based on a color combination (e.g., a characteristic of the print material to be printed via processing the image output with the print mask). For example, a yellow color combination may include a ramp of 32 pixels on either side of a 32-pixel wide disabled section, where as a blue color combination may include a ramp of relatively smaller size, such as ten pixels on either side of a 54-pixel wide disabled section. In some examples, the color combination may not be improved by ramps and the ramps may be discarded (e.g., the ramp section will have a size of zero and the disabled section may be 64 pixels wide).

The ramps adjacent to the disabled section may overlap with respect to other masks and/or within the same masks. In other words, the ramp sections may be overlapping while the continuous disabled sections are non-overlapping. As an example, the ramps 766 and 770 overlap with respect to the media width and may also be overlapping with respect to complementary print masks with complementary disabled sections. The size of the ramp and the size of the disabled section may have an inverse relationship. For example, the disabled section may be decreased in size when a ramp section is increased in size based on adjustments determined by a print system with a mask engine.

FIGS. 8-12 depict example output states of operation of an example print apparatus applying print material onto a print medium 824 using example print masks according to an example. Referring to FIGS. 8-12, the media 824 is advancing in a media advance direction 816 in between each pass of the print head 812 which passes over the media in carriage directions 880 and 882. For example, with reference to FIG. 8, the print head 812 performs a pass over the media 824 ejecting print material according to a print mask with disabled sections such that the first image output of the first pass shows print material for enabled sections of the print mask and no print material for disabled section of the print mask. As the print head 812 performs further passes over the media 824, the disabled sections of the previous passes receive print material and some of the previously enabled sections may not receive further print material on a pass where the print mask places a disabled section of the current pass over the enabled section of a previous pass.

As is shown in FIGS. 8-12, the passes of the print head shift in the media advance direction in the amount of the length of the print head divided by a number of passes of a print mode. In the example of FIGS. 8-12, the number of passes of the print mode is four. Thus, the shift in the media advance direction of FIGS. 8-12 is one-fourth the printable length of the print head. The print mask changes for each pass of the print head 812 such that the disabled section of each pass is in a different location relative to the previous pass. In the examples of FIGS. 9-12, the previous sections receive another layer of print material where some areas have no print material (e.g., the area was covered by only one pass and that area happened to correspond to a disabled section of the print mask), one layer of print material (e.g., where one pass of the corresponding enabled section of the print masks, or where two passes have occurred over the area and one of the passes corresponded to a disabled section for that area), two layers of print material (e.g., where two passes have occurred both with enabled sections corresponding to that area or three passes where one of the passes corresponded to a disabled section for that area) or three layers of print material (where three passes have occurred with corresponding enabled sections for that area—and the next pass will correspond to a disabled section—or all four passes have occurred with disabled sections evenly distributed across all four passes). In this manner, when an area of the media receives a fourth pass, the final output image is made clear in FIGS. 11 and 12 while the areas with less than the total number of passes have an obvious pattern of building the output image with disabled sections placed within the output. In this manner, the final pass resolves the pattern of disabled sections because the disabled sections are equally generated across the entire print mask width over the number of the plurality of masks.

Figure 13:
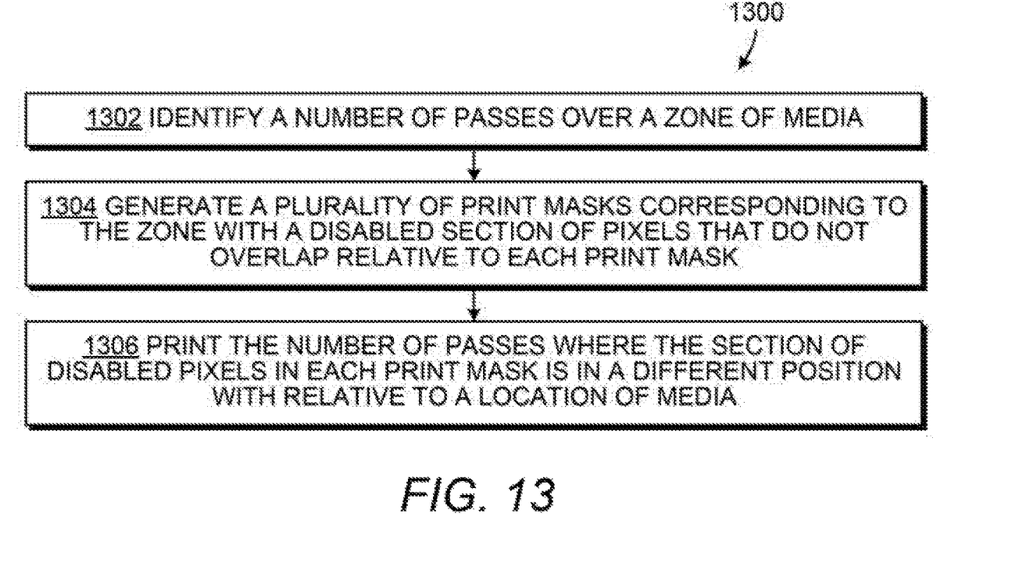
FIGS. 13 and 14 are flow diagrams depicting example methods of printing.
Figure 14:
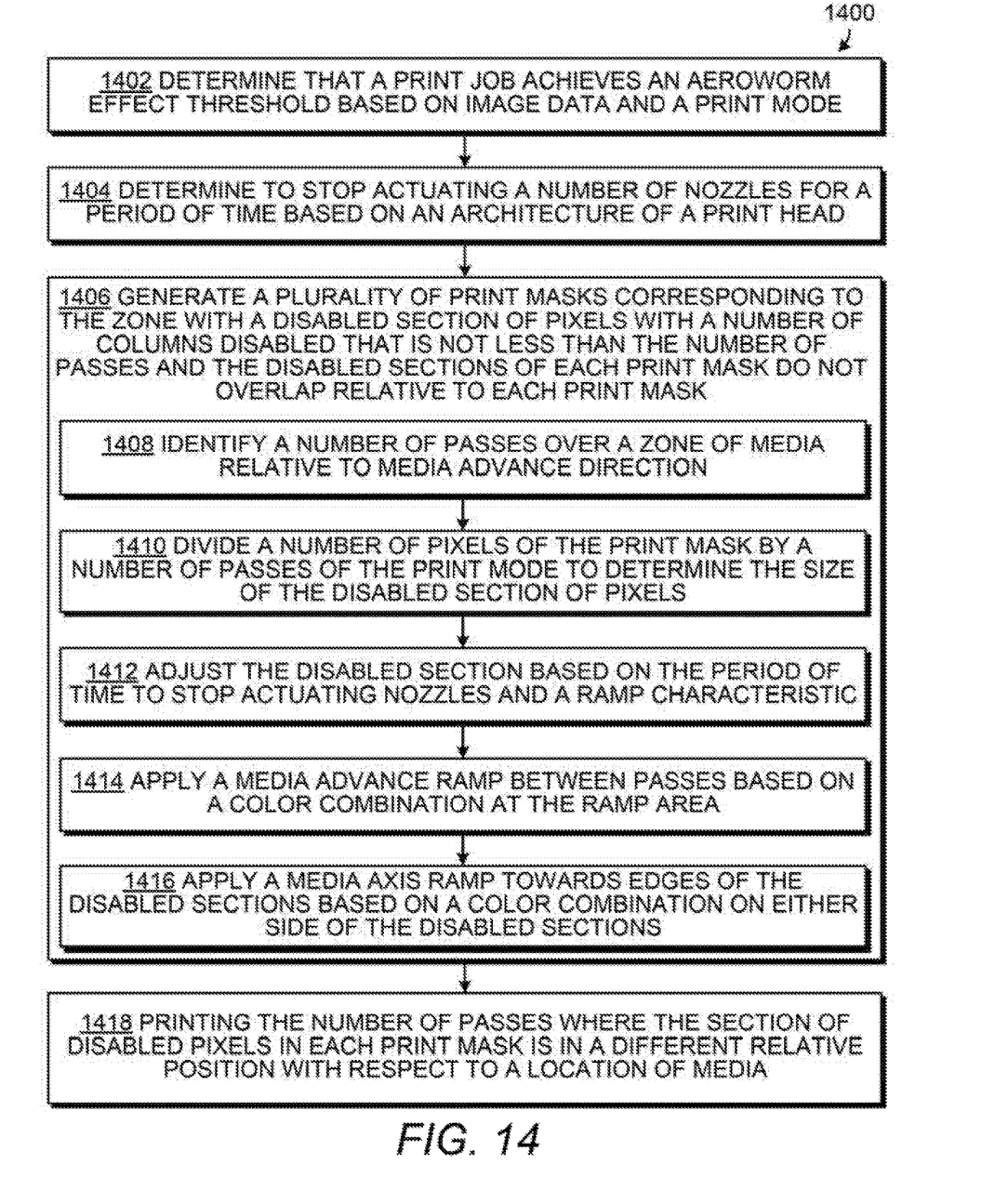

FIGS. 13 and 14 are flow diagrams depicting example methods of printing 1300 and 1400. Referring to FIG. 13, example method 1300 for printing may generally comprise identifying a number of passes over a zone of media, generating a plurality of masks with a disabled section of pixels, and operating a print apparatus to print the number of passes using the plurality of masks. The operations discussed with respect to FIGS. 13 and 14 are performable by the print systems discussed herein via execution of the mask and print engines, such as mask engine 102 and print engine 104 of print system 100.

Referring to FIG. 13, a number of passes to be made over a zone of media is identified at block 1302. The zone of media may be identified relative to the media advance direction. For example, the zone of media may be bound by the width of the media to be printed on and the length may be bound by the length of the print head to perform the printing on the media.

At block 1304, multiple print masks a generated corresponding to the zone with bled section of pixels that do not overlap relative to each print mask. For example, a mask engine (such as mask engine 102 of FIG. 1) may generate a plurality of print masks with non-overlapping disabled section of pixels with a number of columns disabled that is not less than the number of passes identified in block 1302. The number of disabled columns may be less than the number of columns of the print mask divided by the number of passes, for example. As discussed herein, the disabled section repeats along a media axis and does not repeat within an area of a size of the print mask. Indeed, the plurality of print masks may apply to image data such that the disabled sections are offset in each zone in both the media advance direction and a media axis perpendicular to the media advance direction.

At block 1306, the number of passes are printed where the section of the disabled pixels in each print mask is in a different position relative to a location of media (e.g., relative to the zone being passed over with the passes corresponding to the plurality of masks). By printing the number of passes based on the plurality of print masks such that the section of the disabled pixels in each print mask is in a different relative position with respect to a location of the media, the disabled sections may be distributed appropriately and the image quality may be maintained without generating an aeroworm effect in the print zone during the passes printed using the print masks with disabled sections, for example.

FIG. 14 includes blocks similar to blocks of FIG. 13 and provides additional blocks and details. In particular, FIG. 14 depicts additional blocks and details generally regarding determining whether a print job is likely to encounter an aeroworm effect, determining a size of a disabled section, and applying ramps. Blocks 1408, 1406, and 1418 are similar to blocks 1302, 1304, and 1306 of FIG. 13 and, for brevity, their respective descriptions are not repeated in their entirety.

At block 1402, a print job is determined to achieve an aeroworm effect threshold based on image data and a print mode. For example, a characteristic of the print job (such as a combination of firing frequency of a color combination, a print mode with a threshold number of passes, or an area fill condition, etc.) may be identified by image processing analysis and compared to a threshold of that characteristic that corresponds to likely generation of an aeroworm airflow within the print zone. In response to determining an aeroworm effect is likely to be generated, a period of time to stop actuation of a number of nozzles is determined at block 1404 based on an architecture of a print head, such as the resolution (e.g., dots per inch) of the print head. The identification of an aeroworm effect and identification of the time to pause actuation may be performed by a mask engine, such as mask engine 102 of FIG. 1 for example.

The amount of time and/or the number of nozzles to pause actuation may be used (e.g., by a mask engine) to generate a plurality of masks with disabled sections that do not overlap at block 1406. The generation of the print masks may include particular operations such as blocks 1408, 1410, 1412, 1414, and 1416. At block 1408, a number of passes over a zone of media relative to media advance direction are identified. At block 1410, a number of pixels of the size of the print mask is divided by a number of passes of the print mode to determine the disabled section of pixels corresponding to the number of nozzles to stop actuation for the period of lane.

At block 1412, a size of the disabled section based on the period of time to stop actuation the number of nozzles and a characteristic of a ramp between the disabled section and an enabled section. For example, the disabled section size identified at block 1410 may be 64 pixels of a 256-pixel mask for a four-pass print mode, where the disabled section may be reduced to 48 pixels to make room for a 16-pixel wide ramp to ramp the enabled pixels into the disabled pixels. As depicted with respect to FIG. 7, a ramp may overlap and therefore the size of the disabled section may reduce by an amount less than the total size of the ramps on either side of the disabled section. For example, a 16-pixel wide ramp can be placed on either side of the disabled section and, with respect to overlap of the ramps, the disabled section is 48 pixels wide—or reduced by half of the total size of ramps adjacent to the disabled section due to overlapping of ramp sections allowed with respect to another print mask. At block 1414, a media advance ramp (i.e., a ramp that changes ratio of enabled pixels to disabled pixels in the media advance direction) is applied to the print mask between passes based on the color combination at a ramp area and at block 1416, a media axis ramp (i.e., a ramp that changes ratio of enabled pixels to disabled pixels in the media width direction perpendicular to the media advance direction) is applied towards the edges of the disabled section of the print mask based on the color combination on either side of the disabled sections. As discussed herein, the ramps may be applied and/or adjusted based on print job characteristics, such as the color combination to be printed at the potential ramp area where some color combination may better reduce the aeroworm effect by including no ramps as an example. With the plurality of print masks with disabled sections adjusted and generated, printing of the print job may be performed at block 1418 without airflows in the print zone environment that may generate aeroworm effects with satellites of print material.

Although the flow diagrams of FIGS. 13 and 14 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or ail of the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus. Furthermore, the use of the words "first," "second," or related terms in the claims are not used to limit the claim elements to an order or location, but are merely used to distinguish separate claim elements.

The present description has been shown and described with reference to the foregoing examples. It is understood, however, that other forms, details, and examples may be made without departing from the spirit and scope of the following claims.

What is claimed is:

1. A print system comprising:
   a mask engine to cause an imaging pipeline to generate a plurality of masks for printing image data in a media width zone that extends transversally to a media advance direction, the plurality of masks including:
   a first mask corresponding to a first set of nozzle actuations of a print head during a first pass along the media width zone including a first disabled section of pixels corresponding to unactuated nozzles;
   a second mask corresponding to a second set of nozzle actuations of the print head along the media width zone including a second section of disabled nozzles unactuated during a second pass over the media width zone, wherein the second section is non-overlapping with the first section with respect to the media width zone; and a third mask corresponding to a third set of nozzle actuations of the print head along the media width zone including a third section of disabled nozzles unactuated during a third pass over the media width zone, wherein the third section is non-overlapping with the first section and the second section with respect to the media width zone; and a print engine to cause a print head to eject print material in accordance with the plurality of masks such that print material ejected using the first mask, the second mask, and the third mask overlap with respect to a length of the media width zone.

2. The print system of claim 1, wherein the mask engine is to:

determine that a print job may generate aeroworm effect based on actuation frequency threshold and image data of the print job; and identify a sensitivity level based on a characteristic of print material to be ejected by the print head.

3. The print system of claim 1, wherein:

the plurality of masks includes a ramp of disabled and enabled nozzles along a carriage advance direction adjacent to each of the first section, the second section, and the third section.

4. The print system of claim 3, wherein:

a width of the section of disabled nozzles of each of the plurality of masks is based on a number of passes of a print mode; and a characteristic of the ramp of each of the plurality of masks is based on a color combination.

5. The system of claim 1, wherein:

the plurality of print masks repeats with every media width zone of the print job;

the media width zone has a width in the media advance direction that is a length of the print head;

the passes of the print head shift in the media advance direction in an amount of the length of the print head divided by a number of passes of a print mode; and the sections of disabled nozzles repeat along the media width at intervals based on a size of the print mask.

6. A non-transitory computer-readable storage medium comprising a set of instructions executable by a processor resource to:

generate, for a first pass, a first print mask with a first section of pixels with a number of pixels disabled across a number of columns that is equal to or greater than a number of passes corresponding to a swath zone;

generate, for a second pass, a second print mask with a second section of the pixels with the number of pixels disabled across the number of columns that is equal to or greater than the number of passes corresponding to the swath zone, wherein the first section of pixels and the second section of pixels overlap relative to a length of the swath zone and are non-overlapping relative to a width of the swath zone; and generate printing instructions, using the first print mask and the second print mask, that cause a print apparatus to eject a plurality of layers of print fluid over the swath zone that is less than the number of passes.

7. The medium of claim 6, wherein the set of instructions is executable by the processor resource to:

generate first ramps in the media advance direction for the first print mask and the second print mask; and generate second ramps perpendicular to the media advance direction, wherein the ramps are adjacent to the first section and the second section between an area of disabled nozzles and an area of enabled nozzles for the first print mask and the second print mask.

8. The medium of claim 7, wherein the set of instructions is executable by the processor resource to:

determine whether to generate print masks with the first ramps based on a color combination; and determine whether to generate print masks with the second ramps based on a media advance characteristic and the color combination.

9. The medium of claim 6, wherein the set of instructions is executable by the processor resource to:

divide a number of nozzles actuations corresponding to a print mask size into a number of sections based on the number of passes of a print mode;

generate a plurality of print masks designating each of the number of sections to be disabled during a pass of the media width zone of the number of passes of the print mode, the plurality of print masks including the first print mask and the second print mask; and generate instructions to cause the print apparatus to apply the plurality of print masks during corresponding passes of the print head carriage over the swath zone to generate a repeating pattern of offset sections of disabled nozzles.

10. The medium of claim 9, wherein the set of instructions is executable by the processor resource to:

generate the plurality of print masks using a blue noise distribution with the offset sections of disabled nozzles repeating based on a number of nozzles corresponding to a width of each of the plurality of print masks and being non-repeating within the number of nozzles corresponding to the width of each of the plurality of print masks such that the disabled sections are non-overlapping based on shifts of the offset sections for each pass.

11. A method of printing comprising:

identifying a number of passes over a zone of media relative to media advance direction; generating a plurality of print masks corresponding to the zone with a disabled section of pixels with a number of continuous columns disabled that is equal to or greater than the number of passes, wherein the disabled sections of each print mask are non-overlapping with respect to each other; and printing the number of passes based on the plurality of print masks such that the section of the disabled pixels in each print mask is in a different relative position with respect to a location of the media.

12. The method of claim 11, wherein:

the number of disabled columns is less than the number of columns of the print mask divided by the number of passes and the disabled section repeats along a media axis and is non-repeating within an area of a size of the print mask.

13. The method of claim 11, wherein:

the plurality of print masks apply to image data such that the disabled sections are offset in each zone in both the media advance direction and a media axis perpendicular to the media advance direction.

14. The method of claim 11, comprising:

applying a media advance ramp to the print mask between passes based on the color combination at a ramp area;

applying a media axis ramp towards edges of the disabled sections of the print mask based on the color combination on either side of the disabled sections.

15. The method of claim 11, comprising:

identifying that a print job achieves an aeroworm effect threshold based on image data and a print mode;

determining to stop actuation of a number of nozzles for a period of time based on an architecture of a print head;

dividing a number of pixels of the size of the mask by a number of passes of the print mode to determine the disabled section of pixels corresponding to the number of nozzles to stop actuation for the period of time; and adjusting a size of the disabled section based on the period of time to stop actuation the number of nozzles and a characteristic of a ramp between the disabled section and an enabled section.

\* \* \* \* \*